No. 609,195. Patented Aug. 16, 1898.
J. S. CROWELL.
RUBBER TIRE FOR VEHICLE WHEELS.
(Application filed July 30, 1897.)
(No Model.)
2 Sheets—Sheet 2.
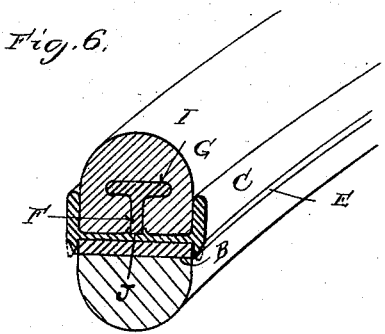
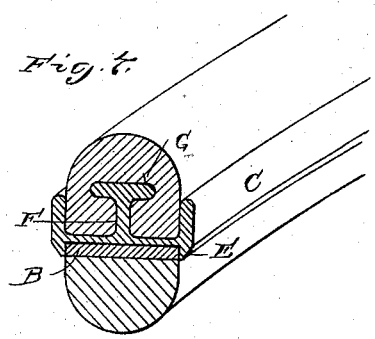
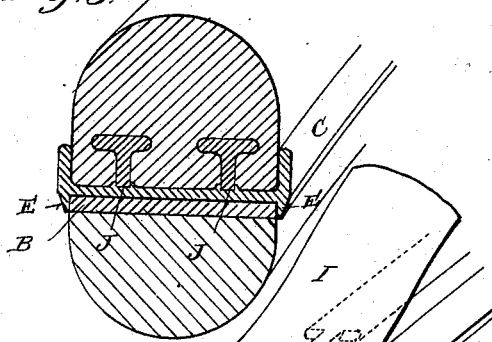
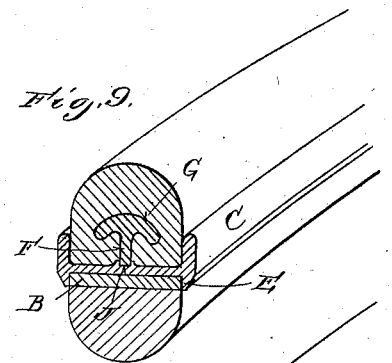
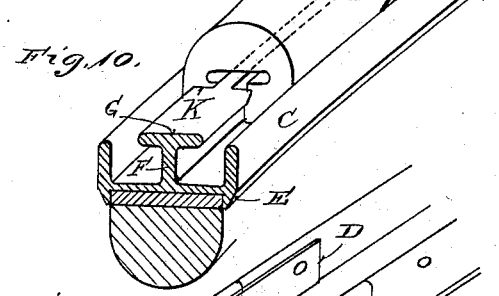
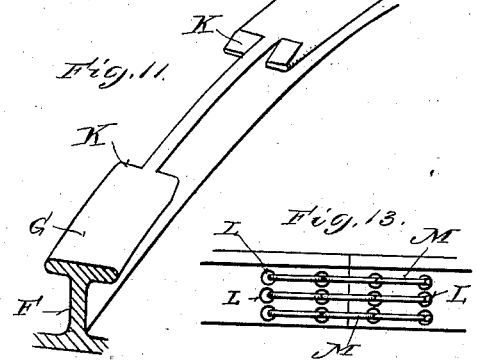
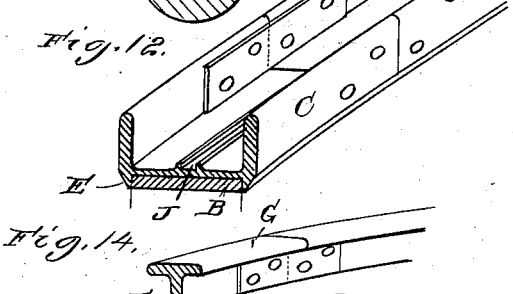
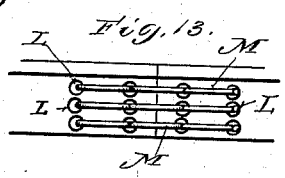
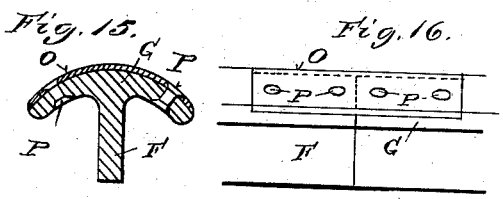
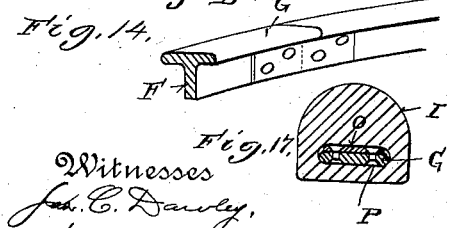
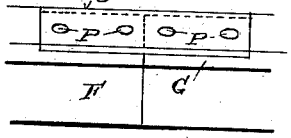
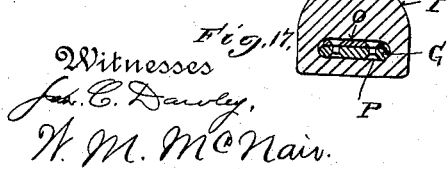
Witnesses
Jas. C. Dawley,
W. M. McNair.
Inventor
John S. Crowell
By his Attorney
H. A. Toulmin.

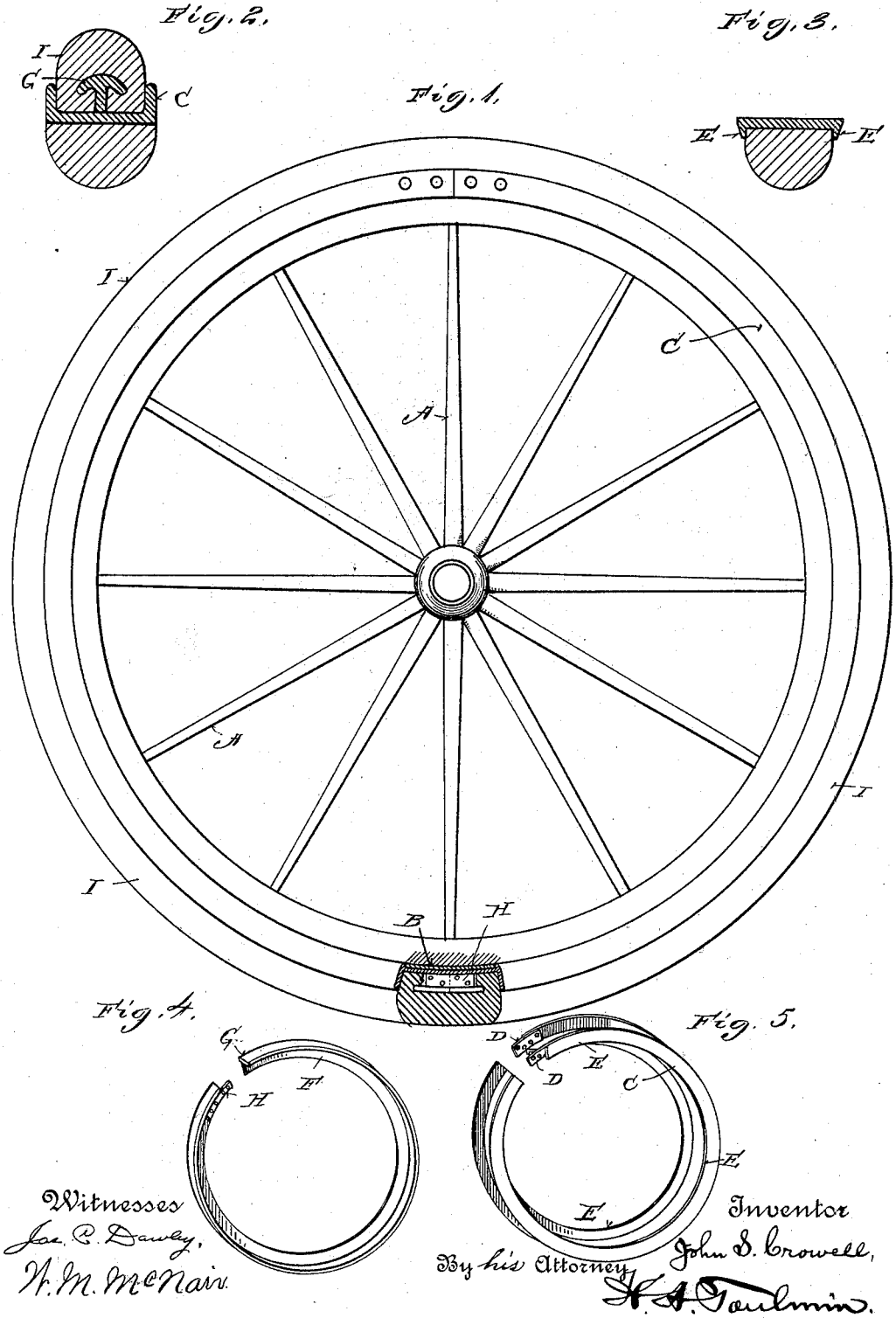

UNITED STATES PATENT OFFICE.

JOHN S. CROWELL, OF SPRINGFIELD, OHIO.

RUBBER TIRE FOR VEHICLE-WHEELS.

SPECIFICATION forming part of Letters Patent No. 609,195, dated August 16, 1898.

Application filed July 30, 1897. Serial No. 646,434. (No model.)

*To all whom it may concern:*

Be it known that I, JOHN S. CROWELL, a citizen of the United States, residing at Springfield, in the county of Clark and State of Ohio, have invented certain new and useful Improvements in Rubber-Tire Equipments for Vehicle-Wheels, of which the following is a specification, reference being had therein to the accompanying drawings.

This invention relates to certain new and useful improvements in rubber-tire equipments for vehicle-wheels.

The general object of my invention is to provide an elastic or rubber tire equipment that can be manufactured and practically completed in the shop or factory and in that condition be shipped to the trade substantially ready to be applied to the various-sized wheels that may be brought to the dealer in this equipment, who with the use of a few special tools will be able to apply the equipment to such wheels in a quick and ready manner.

As the elastic or rubber tire business is now conducted wheels have to be shipped in from various points to a central establishment and there the rubber tires are applied to them, when they have to be reshipped to the owner, which is expensive and involves delay. With my invention I overcome this objectionable and unnecessary incident to the rubber-tire business.

It is also one of the objects of my invention to apply my equipment to vehicle-wheels having on them the ordinary iron tires, which are now removed before the rubber tires are placed upon the wheels and are discarded. I propose to leave them on the wheels and to apply my equipment directly to such tires.

With these general objects stated my invention will be fully understood from the description hereinafter appearing and from the summaries specified in the claims.

In the accompanying drawings, on which like reference-letters indicate corresponding parts, Figure 1 is a side elevation of a wheel with my equipment applied thereto; Fig. 2, a detail transverse sectional view of a wheel-felly, one form of my channel-iron, and a rubber tire; Fig. 3, a similar sectional view of a wheel-felly and a peculiar tire; Fig. 4, a detail perspective view of my tire-retainer as ready for shipment; Fig. 5, a similar view of the channel-iron as ready for shipment; Fig. 6, a detail perspective section of the wheel-felly, an ordinary tire, my channel-iron and retainer, and a rubber tire, showing the retainer separate from the channel-iron. Fig. 7 is a similar view showing the retainer integral with the channel-iron; Fig. 8, a similar view to Fig. 6, showing two retainers made separate from the channel-iron; Fig. 9, another similar view showing a modification in the form of the retainer; Fig. 10, a perspective section showing one manner of applying the rubber tire to the channel-iron and retainer; Fig. 11, a perspective view of a part of the retainer; Fig. 12, a perspective section of a part of a channel-iron, showing one manner of joining its meetings ends; Fig. 13, a side elevation showing one manner of joining the meeting ends of the retainer; Fig. 14, a perspective section showing another manner of joining the meeting ends of the retainer; Fig. 15, a cross-section of a retainer, showing still another manner of joining its meeting ends; Fig. 16, a side elevation of what is shown in Fig. 15, and Fig. 17 a transverse sectional view of a tire and tire-retainer of another modified form.

The letter A designates a vehicle-wheel of any of the ordinary kinds having the usual flat iron tire B, as shown where the parts are broken away. On this tire I place a channel-iron C. (Shown in Fig. 5 in detail.) This channel-iron is in the form of an open ring and will be made in various sizes, so as to proximately fit the various sizes of wheels. A suitable form of joint is provided for connecting the meeting ends. This joint may be made in several different ways. In some cases it may be necessary to file or saw off a small piece of one end of the channel-iron, so as to make it just fit the wheel. The preferred form of joint consists of plates D, riveted to the flanges of the channel-iron and having holes adapted to receive other rivets to be placed in holes to be bored in the other end of the channel-iron after the same is made to fit the wheel. An apparatus forming no part of this invention in the nature of a tire-setter may be used to press the channel-iron or the tire-retainer tightly to the wheel and hold them there while the joint is being made.

The channel-iron has a slight bead E, which binds against the edge of the ordinary iron tire, and thus secures the channel-iron against slipping laterally. I propose sending the channel-iron to the jobbers, dealers, or agents with this bead E turned slightly outward, as seen in dotted lines in Fig. 6, so as to more readily fit over the edge of the common tire, and to supply an apparatus or tool to press or roll down this bead and force it up tight to the edge of the set tire. Referring to Fig. 4, the tire-retainer is clearly seen. This, like the channel-iron, is made in the nature of an open ring and consists of a web F and a head G, forming annular flanges on the web. A suitable joint is provided for this retainer, which may be one of several different methods; but the preferred form consists of a plate H, riveted to one end of the retainer and having holes in the other adapted to receive rivets to be passed through holes to be bored in the other end of the web after the same is applied to the channel-iron or its proper length is determined. This tire-retainer is either fitted with its web in an annular groove in the channel-iron or is made integral with it, as will be hereinafter explained. Assuming that it is to be made in a separate piece and applied to the channel-iron which has already been fitted to the wheel, the rubber tire I is slipped or threaded on one end of the retainer. The tire may be applied even after the retainer is in place in the channel-iron at some intermediate part where a portion of the head G is cut away, as shown in Figs. 10 and 11. The tire being once threaded upon the retainer the latter is sprung out enough to enter into the channel-iron and then the web F is seated in the annular groove J, which prevents the retainer from shifting laterally, while with its ends joined it becomes a closed ring, as it were, and cannot open out, and so it becomes secured within this groove. As before observed, the rubber tire has already been threaded or forced upon this retainer; but it may be afterward so applied to the retainer by resorting to a cut-away part in the retainer, as shown at K in Figs. 10 and 11, in which former figure the rubber tire is shown as in the act of being applied after the retainer is in place.

The same apparatus in the nature of a tire-setter used to facilitate placing and securing the channel-iron on the wheel may also be resorted to in setting and placing the retainer with or without its tire upon it; but this apparatus and the manner of using it form no part of the present invention, and therefore is merely referred to by way of explaining the preferred method pursuant to which the present invention will be applied to wheels.

I will now refer somewhat in detail to the various figures designated 2, 3, and 6 to 16. In Figs. 2 and 3 the felly is shown without the common iron tire, and the base of the channel-iron is shown thicker for that reason. These forms may be used in the case of new wheels which have no common tires already on them. In Fig. 2 the retainer is made separate from the channel-iron, and the head is curved down instead of being flat in cross-section as in the other figures, save Figs. 9, 15, and 16, where the same curved form is shown, which is the preferred form.

In Fig. 3 my annular bead E is shown applied to the common tire placed on an ordinary wooden felly, while in the other figures where it is shown it is applied to my channel-iron form of tire.

In Fig. 6 the retainer is made in a separate piece from the channel-iron, which latter has a groove to receive it.

In Fig. 7 the retainer and channel-iron are integral.

In Fig. 8 two retainers are shown, each made separate from the channel-iron.

In Fig. 9 the curved form of head for the retainer is shown on a retainer which is separate from the channel-iron.

In Fig. 10 the tire is shown, as before observed, as being applied to a retainer already in place in the channel-iron. The tire will be forced on around until the entire circumference of the retainer has been covered, and by then crowding the tire still further a greater length of rubber than the circumference of the retainer will be applied, so as to leave the rubber compressed.

In Fig. 11 the ends K of the head are shown slightly beveled or tapered to facilitate this manipulation of the tire.

In Fig. 12 the form of joint for the ends of the channel-iron (shown on a small scale in Fig. 5) is more clearly illustrated.

In Fig. 13 a modified form of joint for the retainer is shown, in which the ends of the retainer have one or more series of holes L, through which are threaded a series of wires M, so as to tie, as it were, the ends of the retainer together.

In Fig. 14 is also shown, on a larger scale, the form of joint for the retainer which is indicated in Fig. 4.

In Figs. 15 and 16 another form of joint for the retainer is illustrated, in which a curved plate O is placed on top of the meeting ends of the retainer, flush with the surface thereof, and rivets P used to secure the plate.

In Fig. 17 I show a tire of another form in outline and a modified form of tire-retainer, the web F being omitted and the head G alone preserved. The connection of the ends of the retainer is the same as shown in Fig. 15—viz., is made of the plate O, held to the ends of the retainer by suitable rivets P. In this form the retainer has no direct connection with the channel-iron, yet it lies within it and encircles it.

Thus it will be seen that I have provided a type of elastic-rubber-tire equipment for wheels which is adapted to be manufactured substantially complete or entire and then shipped out to the jobbers, dealers, or agents and by them placed upon wheels in use with the common iron tire and that the rubber tire is held against lateral shifting or displacement both by the retainer proper and the flanges of the channel-iron and is also held against radial displacement by the head of the retainer.

It will be observed from Fig. 2 that the groove J is omitted, while in other figures it appears. Thus it will be understood that the groove J may or may not be used when the retainer is separate from the tire.

Having thus fully described my invention, what I claim as new, and desire to secure by Letters Patent, is—

1. In an elastic or rubber tire equipment, the combination with a channel-iron composed of an open ring having inwardly-projecting flanges to embrace the edges of an ordinary wheel structure, and two outwardly-extending flanges to form a groove for the rubber tire, and means to secure the ends of such ring together with the ends more or less remote, of a tire-retainer secured to such ring, extending circumferentially around it and itself in the form of an open ring, such retainer being cut away in its outer part for a short portion of its circumference, and a rubber tire proper formed with an interior space adapted to fit said retainer and adapted to be threaded upon the retainer at the point of such cut-away part.

2. In an elastic or rubber tire equipment, the combination with a channel-iron formed of an open ring having perforated plates secured to one end and adapted to be secured to the other end with the ends at different distances apart according to the length and circumference desired, said channel-iron having inwardly-extending flanges to embrace the wheel structure, and outwardly-extending flanges to form a groove for the tire proper, and a tire-retainer having a web and a head crosswise the web, and secured within the channel-iron, the retainer being also in the form of an open ring, and the head being cut away a short portion of its circumference, and a rubber tire proper having a space correspondingly shaped to the cross-section of the retainer and adapted to be threaded upon the retainer at the cut-away portion of the retainer, all as substantially shown and described.

3. In an elastic or rubber tire equipment, the combination with a channel-iron having one or more circumferential grooves, of a retainer fitted in each groove, and means to secure the ends of the channel-iron and the ends of the retainer or retainers.

In testimony whereof I affix my signature in presence of two witnesses.

JOHN S. CROWELL.

Witnesses:
W. M. McNAIR,
JAS. C. DAWLEY.